(12) United States Patent
Otsuya et al.

(10) Patent No.: US 10,542,082 B2
(45) Date of Patent: Jan. 21, 2020

(54) COMMUNICATION CONTROL APPARATUS, COMMUNICATION CONTROL METHOD AND COMMUNICATION CONTROL PROGRAM

(71) Applicant: NTT Communications Corporation, Chiyoda-ku (JP)

(72) Inventors: Ryosuke Otsuya, Miura-gun (JP); Hiroaki Sadata, Nerima-ku (JP)

(73) Assignee: NTT Communications Corporation, Chiyoda-ku (JP)

( * ) Notice: Subject to any disclaimer, the term of this patent is extended or adjusted under 35 U.S.C. 154(b) by 183 days.

(21) Appl. No.: 15/546,367

(22) PCT Filed: Jan. 28, 2016

(86) PCT No.: PCT/JP2016/052519
§ 371 (c)(1),
(2) Date: Jul. 26, 2017

(87) PCT Pub. No.: WO2016/121881
PCT Pub. Date: Aug. 4, 2016

(65) Prior Publication Data
US 2018/0007124 A1 Jan. 4, 2018

(30) Foreign Application Priority Data

Jan. 29, 2015 (JP) .................................. 2015-015899
Jan. 29, 2015 (JP) .................................. 2015-015904

(51) Int. Cl.
*G06F 15/16* (2006.01)
*H04L 29/08* (2006.01)
(Continued)

(52) U.S. Cl.
CPC ............ *H04L 67/104* (2013.01); *H04L 12/66* (2013.01); *H04L 67/02* (2013.01); *H04L 63/10* (2013.01)

(58) Field of Classification Search
CPC ....... H04L 67/104; H04L 12/66; H04L 67/02; H04L 63/10
(Continued)

(56) References Cited

U.S. PATENT DOCUMENTS 5,931,946 A 8/1999 Terada et al.
6,704,327 B1 * 3/2004 Gardner ................. H04L 12/66
370/395.1
(Continued)

FOREIGN PATENT DOCUMENTS

EP 2 824 891 A1 1/2015
JP 9-214493 A 8/1997
(Continued)

OTHER PUBLICATIONS

International Search Report dated Apr. 12, 2016, in PCT/JP2016/052519 filed Jan. 28, 2016.
(Continued)

*Primary Examiner* — Melvin H Pollack
(74) *Attorney, Agent, or Firm* — Oblon, McClelland, Maier & Neustadt, L.L.P.

(57) ABSTRACT

A communication control apparatus connected to two terminals and to a relay apparatus that relays P2P communication performed between the two terminals, including: storage means configured to store authority information including a communication method of the P2P communication permitted for each of the two terminals; reception means configured to receive a signaling signal mutually transmitted between the two terminals; and control means configured to control the communication method of the P2P
(Continued)

communication based on the authority information when receiving the signaling signal.

12 Claims, 9 Drawing Sheets

(51) Int. Cl.
  *H04L 12/66* (2006.01)
  *H04L 29/06* (2006.01)
(58) Field of Classification Search
  USPC .......................................................... 709/217
  See application file for complete search history.

(56) References Cited

U.S. PATENT DOCUMENTS

| | | | |
|---|---|---|---|
| 9,307,031 B2 * | 4/2016 | Santhanam | H04L 67/141 |
| 9,444,784 B2 * | 9/2016 | Burns | H04L 29/1249 |
| 9,614,905 B2 * | 4/2017 | Baratz | H04L 29/12094 |
| 9,621,518 B2 * | 4/2017 | Wang | H04L 61/2589 |
| 9,648,066 B2 * | 5/2017 | Cheung | H04L 67/1078 |
| 9,667,713 B2 * | 5/2017 | Vyrros | A63F 13/335 |
| 9,668,166 B2 * | 5/2017 | Santhanam | H04W 28/0268 |
| 9,712,593 B2 * | 7/2017 | Gangadharan | H04L 67/02 |
| 9,716,619 B2 * | 7/2017 | Bellan | H04L 63/104 |
| 9,736,316 B2 * | 8/2017 | Chen | H04L 61/2582 |
| 9,762,508 B2 * | 9/2017 | Kaufman | H04L 61/2575 |
| 9,763,179 B2 * | 9/2017 | Pragada | H04W 12/06 |
| 9,807,059 B2 * | 10/2017 | Stahl | H04L 12/1403 |
| 10,021,729 B2 * | 7/2018 | Huttunen | H04L 12/66 |
| 10,027,732 B2 * | 7/2018 | Hutton | H04L 45/74 |
| 10,057,307 B2 * | 8/2018 | Jacquemot | H04L 65/403 |
| 10,135,806 B2 * | 11/2018 | Saridaki | H04L 65/1006 |
| 10,212,214 B2 * | 2/2019 | Rameil-Green | H04L 41/28 |
| 10,225,340 B2 * | 3/2019 | Arolovitch | H04L 12/66 |
| 10,244,003 B2 * | 3/2019 | Gunnalan | H04L 45/123 |
| 2014/0095724 A1 | 4/2014 | Yoakum et al. | |
| 2015/0113110 A1 | 4/2015 | Shimakawa | |

FOREIGN PATENT DOCUMENTS

| | | |
|---|---|---|
| JP | 2004-180003 A | 6/2004 |
| JP | 2006-350561 A | 12/2006 |
| JP | 2008-311764 A | 12/2008 |
| JP | 2009-188554 A | 8/2009 |
| JP | 2011-188358 A | 9/2011 |
| JP | 2014-6828 A | 1/2014 |
| WO | 2013 /145522 A1 | 10/2013 |

OTHER PUBLICATIONS

Sensui. "Web Front End Saizensen Ryuko ni Odorasarenai Gijutsu Doko Dai 1 Kai", WEB+DB Press vol. 81, Jul. 25, 2014, 11 pages, with Partial English Translation.

Rosenberg. "Interactive Connectivity Establishment (ICE): A Protocol for Network Address Translator (NAT) Traversal for Offer/Answer Protocols", Internet Engineering Task Force (IETF), Apr. 2010, p. 1-117.

Uberti et al., "Javascript Session Establishment Protocol draft-ietf-rtcweb-jsep-08", Network Working Group, Oct. 27, 2014, p. 1-65.

Office Action dated Jan. 31, 2017, in Japanese Patent Application No. 2016-096380, with English translation.

Office Action dated Mar. 9, 2017, in Japanese Patent Application No. 2016-096373, with English translation.

Extended European Search Report dated Aug. 2, 2018 in Patent Application No. 16743484.4, citing documents AA & AO therein, 16 pages.

Office Action dated Nov. 22, 2019 in European Application No. 16 743 484.4.

\* cited by examiner

FIG.4A

AUTHORITY INFORMATION TABLE

| TERMINAL IDENTIFIER | INTERNAL COMMUNICATION FLAG | EXTERNAL COMMUNICATION (WITHOUT RELAY) FLAG | EXTERNAL COMMUNICATION (WITH RELAY) FLAG |
|---|---|---|---|
| A | ○ | ○ | ○ |
| B | ○ | × | × |
| C | ○ | ○ | × |
| D | × | × | ○ |

FIG.4B

COMMUNICATION DESTINATION PERMISSION INFORMATION TABLE

| ADDRESS TYPE | ADDRESS INFORMATION |
|---|---|
| COMMUNICATION DESTINATION TERMINAL | 192.168.1.* |
| RELAY APPARATUS | 192.0.2.15 |

FIG.8A

TERMINAL 30a ⇒ TERMINAL 30b

TERMINAL IDENTIFIER OF SIGNAL TRANSMISSION SOURCE = A,
TERMINAL IDENTIFIER OF SIGNAL TRANSMISSION DESTINATION = B

SDP OFFER SETTING VALUE
[INTERNAL COMMUNICATION]: IP ADDRESS, PORT OF TERMINAL 30a
[EXTERNAL COMMUNICATION (WITHOUT RELAY)]: IP ADDRESS, PORT
OF TERMINAL 30a AFTER NAT CONVERSION
[EXTERNAL COMMUNICATION (WITH RELAY)]: IP ADDRESS, PORT
FOR RELAY OF RELAY APPARATUS

FIG.8B

TERMINAL 30b ⇒ TERMINAL 30a

TERMINAL IDENTIFIER OF SIGNAL TRANSMISSION SOURCE = B,
TERMINAL IDENTIFIER OF SIGNAL TRANSMISSION DESTINATION = A

SDP ANSWER SETTING VALUE
[INTERNAL COMMUNICATION]: IP ADDRESS, PORT OF TERMINAL 30b
[EXTERNAL COMMUNICATION (WITHOUT RELAY)]: IP ADDRESS, PORT
OF TERMINAL 30b AFTER NAT CONVERSION
[EXTERNAL COMMUNICATION (WITH RELAY)]: IP ADDRESS, PORT
FOR RELAY OF RELAY APPARATUS

COMMUNICATION CONTROL APPARATUS, COMMUNICATION CONTROL METHOD AND COMMUNICATION CONTROL PROGRAM

TECHNICAL FIELD

The present invention relates to a communication control apparatus, a communication control method and a communication control program.

BACKGROUND ART

P2P communication techniques in which direct communication is performed between two terminals are known. Here, in a case in which communication is performed between terminals using a P2P communication technique, there are cases where direct communication between terminals cannot be performed depending on configuration of networks to which the terminals are connected. For example, in a case in which two terminals belong to different private networks respectively, packets may be discarded depending on the specification of NAT (Network Address Translation), so that direct communication between terminals cannot be performed. In view of this, there is a technique called ICE (Interactive Connectivity Establishment) as a technique for enabling communication between terminals belonging to a private network (see, for example, non-patent document 1). The ICE makes it possible to perform direct communication between terminals by exchanging, between terminals, via a signaling server, an address of the terminal itself, an address in the public network side of NAT, and an address of a relay apparatus placed on a public network. Also, as a signaling protocol using the ICE in the WebRTC technique, JSEP (Javascript (registered trademark) trademark) Session Establishment Protocol) is known (refer to non-patent document 2, for example).

RELATED ART DOCUMENT

Non-Patent Document

[NON-PATENT DOCUMENT 1] RFC5245: Interactive Connectivity Establishment (ICE)
[NON-PATENT DOCUMENT 2] JSEP: draft-ietf-rtcweb-jsep-08

SUMMARY OF THE INVENTION

Problem to be Solved by the Invention

Here, in companies and the like, in order to strengthen security, there is a case in which it is desirable to prohibit P2P communication between a terminal connected in a company LAN and a terminal connected to an external network.

However, if all accesses to the external network from terminals connected in the company LAN are prohibited, use of other company's services provided in the form of SaaS (Service as a Service) and the like cannot be supported, for example. Also, depending on the position of the user of the terminal, there is a case in which P2P communication with a terminal connected to an external network may be permitted, thus, there is a problem in that flexible handling cannot be made.

In view of the above-mentioned points, an object of the disclosed technique is to provide a technique that makes it possible to flexibly control P2P communication that is performed between arbitrary terminals.

In addition, when the ICE is used, depending on the specification of NAT, P2P communication is performed via a relay apparatus. Therefore, there is a risk that an invalid relay device is installed by a third party and P2P communication performed via the relay apparatus is intercepted.

In view of the above-mentioned points, an object of the disclosed technique is to provide a technique that can improve security of P2P communication that is performed between arbitrary terminals.

Means For Solving the Problem

A communication control apparatus of a discloses technique is a communication control apparatus connected to two terminals and to a relay apparatus that relays P2P communication performed between the two terminals, including:
storage means configured to store authority information including a communication method of the P2P communication permitted for each of the two terminals;
reception means configured to receive a signaling signal mutually transmitted between the two terminals; and
control means configured to control the communication method of the P2P communication based on the authority information when receiving the signaling signal.

Also, a communication control apparatus of a discloses technique is a communication control apparatus that is connected, via a network, to a terminal and to a relay apparatus relaying P2P communication performed by the terminal, and that controls communication performed by the terminal, including:
storage means configured to store communication destination information including a communication destination permitted for the terminal;
reception means configured to receive, from the terminal, a signaling signal that the terminal transmits when the terminal starts the P2P communication; and
control means configured to control whether to permit the P2P communication based on the communication destination information and the signaling signal.

Effect of the Present Invention

According to a disclosed technique, it becomes possible to flexibly control P2P communication that is performed between arbitrary terminals. Also, according to a disclosed technique, it becomes possible to improve security of P2P communication that is performed between arbitrary terminals.

BRIEF DESCRIPTION OF THE DRAWINGS

FIG. 4A is a diagram showing an example of an authority information table;

FIG. 4B is a diagram showing an example of a communication destination permission information table;

FIG. 8A is a diagram showing an example of a signaling signal;

FIG. 8B is a diagram showing an example of a signaling signal.

EMBODIMENTS FOR CARRYING OUT THE INVENTION

In the following, an embodiment is described with reference to figures. In each figure, the same configuration parts are assigned the same reference symbols, and there is a case in which redundant description is not provided.

Note that, in the following description, P2P communication by a WebRTC (Web Real-Time Communication) technique is described as an example. However, the terminal management system in the embodiment can be also applied to P2P communication using techniques other than the WebRTC.

Figure 1:
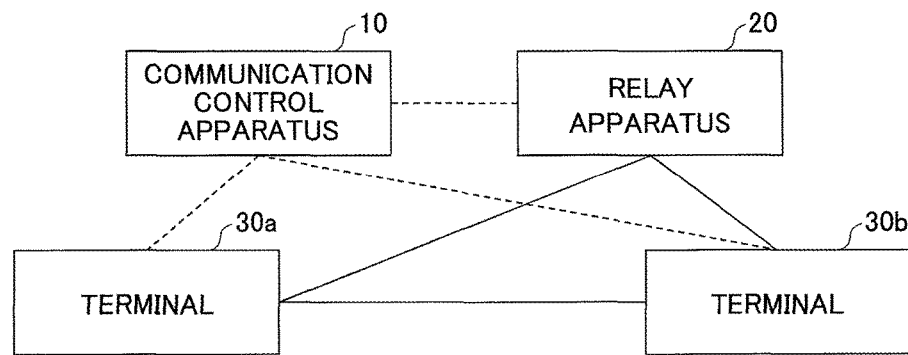
FIG. 1 is a diagram showing an example of a configuration of a communication system according to an embodiment.

FIG. 1 is a diagram showing an example of a configuration of a communication system in an embodiment. The communication system of the embodiment includes a communication control apparatus 10 for controlling P2P communication that is performed between a terminal 30*a* and a terminal 30*b*, a relay apparatus 20 that relays P2P communication, the terminal 30*a* and the terminal 30*b*. In the following description, an arbitrary terminal of the terminals (30*a*, 30*b*) is represented as "terminal 30".

The communication control apparatus 10, the relay apparatus 20, the terminal 30*a* and the terminal 30*b* are connected via a network respectively such that they can communicate with each other.

The communication control apparatus 10 has a function of relaying a signaling signal that is transmitted and received between terminals 30 mutually when a communication channel is established between terminals 30 according to a connection procedure defined in the specification of WebRTC. Also, the communication control apparatus 10 controls communication methods used when the terminals 30 establish P2P communication by using the signaling signal. The communication control apparatus 10 is, for example, a signaling relay server used in WebRTC.

The relay apparatus 20 is an apparatus configured to relay P2P communication performed between the terminals 30. For example, the relay apparatus 20 is a TURN (Traversal Using Relays around NAT) server that is used in the WebRTC technique. First, when the relay apparatus 20 receives a request from the terminal 30, the relay apparatus 20 assigns an IP address and a port number for use in relay of communication, and transmits them to the terminal 30. Next, the terminal 30 transmits a packet to be transmitted to a partner terminal 30 to the IP address and the port number received from the relay apparatus 20. Next, the relay apparatus 20 transfers a received packet to the communication partner terminal 30. In this way, the relay apparatus 20 relays the P2P communication performed between the terminals 30.

The terminal 30 is a communication device such as a PC (Personal Computer) having a Web browser, a mobile phone, a smartphone, or a tablet terminal or the like, for example. By causing a client module (HTML file including JavaScript (registered trade mark), for example) received from a Web server to operate on a Web browser, the terminal 30 realizes P2P communication by WebRTC with the partner terminal 30. Note that the terminal 30 may be any communication device as long as P2P communication can be performed.

Here, the WebRTC technique is briefly described. The WebRTC technique is a technique for realizing real-time P2P communication using the Web browser between the terminals 30. Generally, in many cases, the terminal 30 is connected to a private network in a company or in a house, so that it is not possible to perform communication directly between the terminals 30. Thus, the WebRTC technique makes it possible that the terminals 30 can directly communicate with each other even when the terminals 30 are connected to a private network, by realizing communication that traverses NAT by the ICE procedure.

The ICE procedure provides a mechanism for notifying the terminal 30 of an IP address and a port number (that is, an IP address and a port number that are seen from the Internet side), converted by the NAT, by utilizing a STUN (Session Traversal Utilities for NAT) server that is installed in the Internet side, and a mechanism for relaying P2P communication using a TURN server that is installed in the Internet side. Accordingly, the WebRTC technique is designed such that P2P communication can be performed by traversing the NAT even when the terminal 30 is connected to any network by utilizing the ICE procedure.

Also, WebRTC can use any signaling protocol. For example, the WebRTC may use a proprietary signaling protocol, or may use SIP (Session Initiation Protocol).

In the ICE procedure, a mechanism is defined in which three addresses (ICE Candidates) corresponding to the following communication methods 1~3 respectively are described in a format of SDP (Session Description Protocol), and the three addresses are notified between two terminals 30 each other using an arbitrary signaling protocol.

(Communication Methods and Addresses Defined in the ICE Procedure)

Communication method 1 (local communication without passing through a NAT (to be referred to as "internal communication" hereinafter)): an IP address and a port number of the terminal 30 itself.

Communication method 2 (communication that traverses a NAT but does not use a TURN server (to be referred to as "external communication (without relay)" hereinafter)): a NAT-converted IP address and port number of the terminal 30.

Communication method 3 (communication that uses a TURN server (to be referred to as "external communication (with relay)" hereinafter)): an IP address (to be referred to as "IP address for relay" hereinafter) and a port number for P2P communication relay assigned from the TURN server.

The terminal 30 performs negotiation to establish P2P communication by transmitting a packet, with each other, in a priority order, to each of the three addresses notified from a partner terminal 30 by the ICE procedure.

For example, in a case where two terminals 30 are connected to a same local network, P2P communication is established using an address of "internal communication" whose priority is high. In a case where two terminals 30 communicate via a NAT, P2P communication is established by using an address of "external communication (without relay)" whose priority is medium or an address of "external communication (with relay)" whose priority is low. Which address between the address of "external communication (without relay)" whose priority is medium and the address of "external communication (with relay)" whose priority is low to use for establishing P2P communication depends on the specification of the NAT. Note that, it is predetermined in the ICE procedure that "internal communication" is high priority, "external communication (without relay)" is medium priority and "external communication (with relay)" is low priority.

Here, operation outline of the communication system in the embodiment is briefly described. When the communication control apparatus 10 receives a signaling signal from the terminal 30, the communication control apparatus 10 checks which communication method among the "communication method 1" to "communication method 3" the terminal 30 is permitted to perform P2P communication with, by using authority information that is preset for the terminal 30. For example, when only the procedure of "communication method 1" is permitted, the communication control apparatus 10 deletes IP addresses corresponding to "communication method 2" and "communication method 3" included in the signaling signal, or the communication control apparatus 10 discards the signaling signal including the IP addresses corresponding to "communication method 2" and "communication method 3" included in the signaling signal without relaying the signaling signal. Accordingly, the terminal 30 cannot establish P2P communication by "communication method 2" and "communication method 3". Similarly, when only the procedure of "communication method 3" is permitted, the communication control apparatus 10 deletes IP addresses corresponding to "communication method 1" and "communication method 2" included in the signaling signal, or the communication control apparatus 10 discards the signaling signal including the IP addresses corresponding to "communication method 1" and "communication method 2" without relaying the signaling signal. Accordingly, the terminal 30 cannot establish P2P communication by "communication method 1" and "communication method 2".

Also, when the communication control apparatus 10 permits communication by "communication method 3" between the terminals 30, the communication control apparatus 10 instructs the relay apparatus 20 to record P2P communication performed between the terminals 30 as necessary.

Also, when the communication control apparatus 10 receives a signaling signal from the terminal 30, the communication control apparatus 10 compares communication destination permission information that the communication control apparatus 10 holds beforehand with the received signaling signal, and, when the signaling signal includes an address of destination for which communication is not permitted, the communication control apparatus 10 deletes the address, or discards the signaling signal including the address without relaying the signaling signal. Accordingly, the terminal 30 cannot establish P2P communication with a terminal 30 of a destination that is not permitted.

That is, the communication system of the present embodiment can control variously P2P communication performed between terminals 30 by rewriting or discarding, by the communication control apparatus 10, the signaling signal performed by WebRTC.

<Hardware Configuration>

Figure 2:
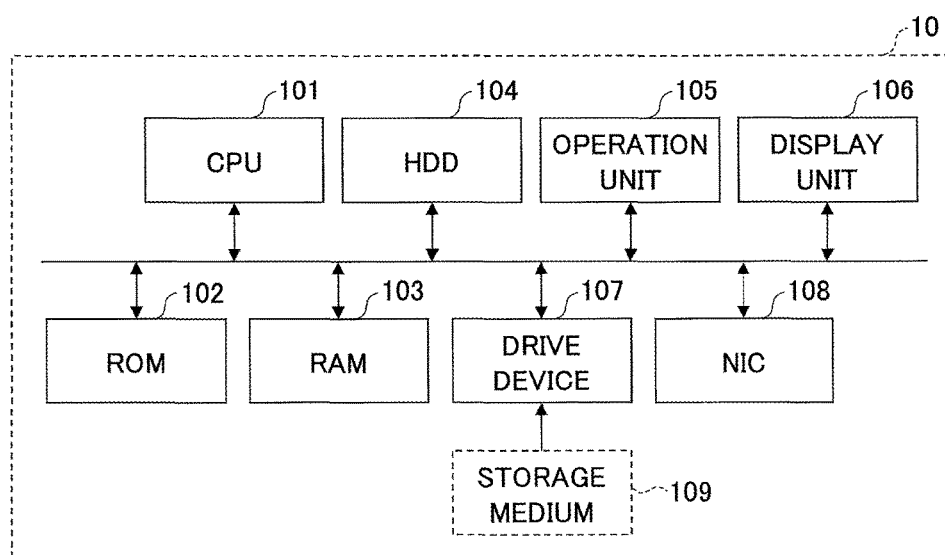
FIG. 2 is a diagram showing an example of a hardware configuration of a communication control apparatus according to an embodiment.

FIG. 2 is a diagram showing an example of a hardware configuration of the communication control apparatus 10 of the embodiment. The communication control apparatus 10 of the embodiment includes a CPU 101, a ROM 102, a RAM 103, an HDD 104, an operation unit 105, a display unit 106, a drive device 107 and a NIC (Network Interface card) 108.

The CPU 101 is a processor for performing control of the whole communication control apparatus 10. The CPU 101 executes an operating system, an application, programs of various services and the like stored in the HDD 104 and the like to realize various functions of the communication control apparatus 10. The ROM 102 stores various kinds of programs and data used by the programs and the like. The RAM 103 is used as a memory area for loading programs, a work area of the loaded programs and the like. The HDD 104 stores various kinds of information and programs and the like.

The operation unit 105 is hardware for receiving input operation from a user, and is, for example, a keyboard or a mouse. The display unit 106 is hardware for performing display to a user.

The drive device 107 reads a program from a storage medium 109 that records the program. The program read by the drive device 107 is installed in the HDD 104, for example. The NIC 108 is a communication interface that connects the communication control apparatus 10 to a network, and that performs transmission and reception of data.

The storage medium 109 is a non-transitory storage medium. As examples of the storage medium 109, there are a magnetic storage medium, an optical disk, a magneto-optical storage medium, a non-volatile memory and the like.

The hardware configuration of the relay apparatus 20 is the same as that shown in FIG. 2. Thus, the description is not provided.

As hardware resources used for the communication control apparatus 10 and the relay apparatus 20, hardware resources provided by a cloud service may be used, for example.

<Software Configuration>

(Communication Control Apparatus)

Figure 3:
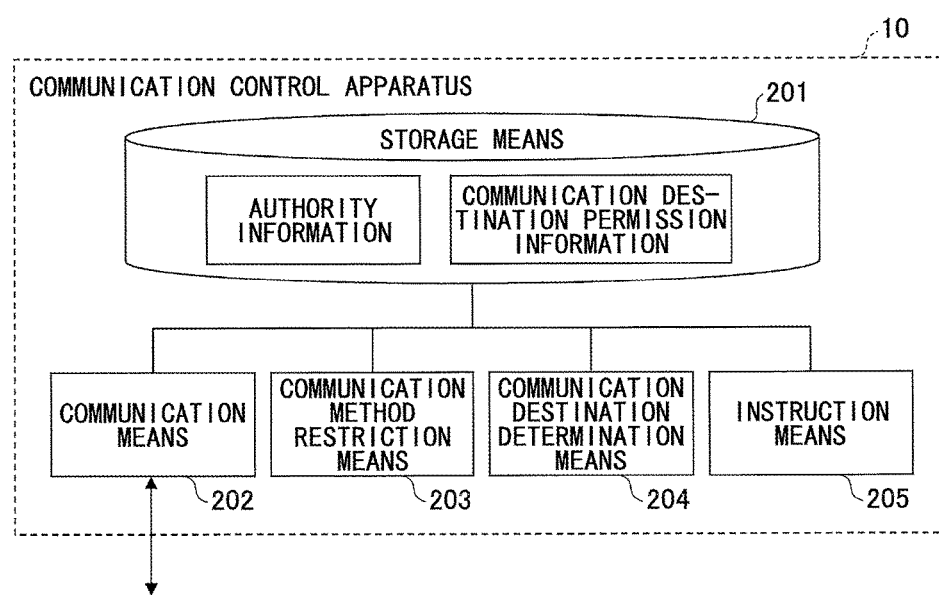
FIG. 3 is a diagram showing an example of a software configuration of a communication control apparatus according to an embodiment.

FIG. 3 is a diagram showing an example of a software configuration of the communication control apparatus according to an embodiment. The communication control apparatus 10 of the embodiment includes a storage means 201, a communication means 202, a communication method restriction means 203, a communication destination determination means 204 and an instruction means 205. FIG. 3 shows an example of a software configuration of the communication control apparatus in the embodiment, however, it is also possible to configure each function of the communication control apparatus as hardware such an integrated circuits and the like, and the configuration shown in FIG. 3 can be taken as a hardware configuration. Also, the storage means 201, the communication means 202, the communication method restriction means 203, the communication destination determination means 204 and the instruction means 205 can be replaced with a storage unit 201, a communication unit 202, a communication method restriction unit 203, a communication destination determination unit 204 and an instruction unit 205 respectively.

The storage means 201 can be realized by using the RAM 103, the HDD 104, or a storage device and the like connected to the communication control apparatus 10 via the network. The storage means 201 stores authority information indicating a communication method to permit for the terminal 30, and communication destination permission information indicating an address of a communication partner destination to which the terminal 30 is permitted to communicate with.

The communication means 202 performs communication with the relay apparatus 20 or the terminal 30 via the NIC 108.

When the communication method restriction means 203 receives a signaling signal from the terminal 30, the communication method restriction means 203 determines, based on the authority information, which communication method to permit for the terminal 30 from among the internal communication, the external communication (without relay), and the external communication (with relay). Also, the communication method restriction means 203 rewrites the signaling signal based on the determination result to transmit the rewritten signaling signal to the terminal 30, or discards the signaling signal without transmitting it to the terminal 30 based on the determination result.

When the communication destination determination means 204 receives a signaling signal from the terminal 30, the communication destination determination means 204 determines whether the communication partner with which the terminal 30 intends to perform P2P communication is a permitted communication partner based on the communication destination permission information. When the terminal 30 intends to perform P2P communication with a non-permitted communication partner, the communication destination determination means 204 transmits the rewritten signaling signal to the terminal 30 or discards the signaling signal without transmitting it to the terminal 30.

Based on the authority information, the instruction means 205 instructs the relay apparatus 20 to record (capture) P2P communication performed between designated terminals 30.

FIGS. 4A and 4B are diagrams showing examples of an authority information table and a communication destination permission information table. The authority information shown in FIG. 4A includes a terminal identifier, an internal communication flag, an external communication (without relay) flag, and an external communication (with relay) flag.

The terminal identifier is an identifier for the communication control apparatus 10 to uniquely identify a terminal 30.

The internal communication flag is a flag indicating whether to permit internal communication in the ICE procedure, in which "o" indicates permitting P2P communication by internal communication, and "x" indicates not permitting P2P communication by internal communication.

The external communication (without relay) flag is a flag indicating whether to permit or not external communication (without relay) in the ICE procedure, in which "o" indicates permitting P2P communication by external communication (without relay), and "x" indicates not permitting P2P communication by external communication (without relay).

The external communication (with relay) flag is a flag indicating whether to permit or not external communication (with relay) in the ICE procedure, in which "o" indicates permitting P2P communication by external communication (with relay), and "x" indicates not permitting P2P communication by external communication (with relay).

The communication destination permission information shown in FIG. 4B includes an address type and address information. As the address type, a type of a communication partner permitted as a communication destination is set. When "communication destination terminal" is set in the address type, it indicates that an address set in the address information is an address of a terminal 30 permitted as a communication destination of P2P communication. When "relay apparatus" is set in the address type, it indicates that an address set in the address information is an address of the relay apparatus 20 to which connection is permitted. In the example of FIG. 4B, "192.168.1.*" is set in the record of address type of "communication destination terminal". This indicates that P2P communication is permitted only when the IP address of the terminal 30 of the communication partner is an address of 192.168.1.* (* indicates an arbitrary number), and that P2P communication to a terminal 30 having an IP address other than the permitted address is not permitted. Also, "192.0.2.15" is set in a record of an address type "relay apparatus". This indicates that P2P communication by the communication method of external communication (with relay) is permitted only when the IP address of the relay apparatus 20 used for relay of P2P communication is 192.168.2.15.

Note that the communication destination permission information table may be configured such that a plurality of IP addresses can be set, or a range of IP addresses can be set.

(Relay Apparatus)

Figure 5:
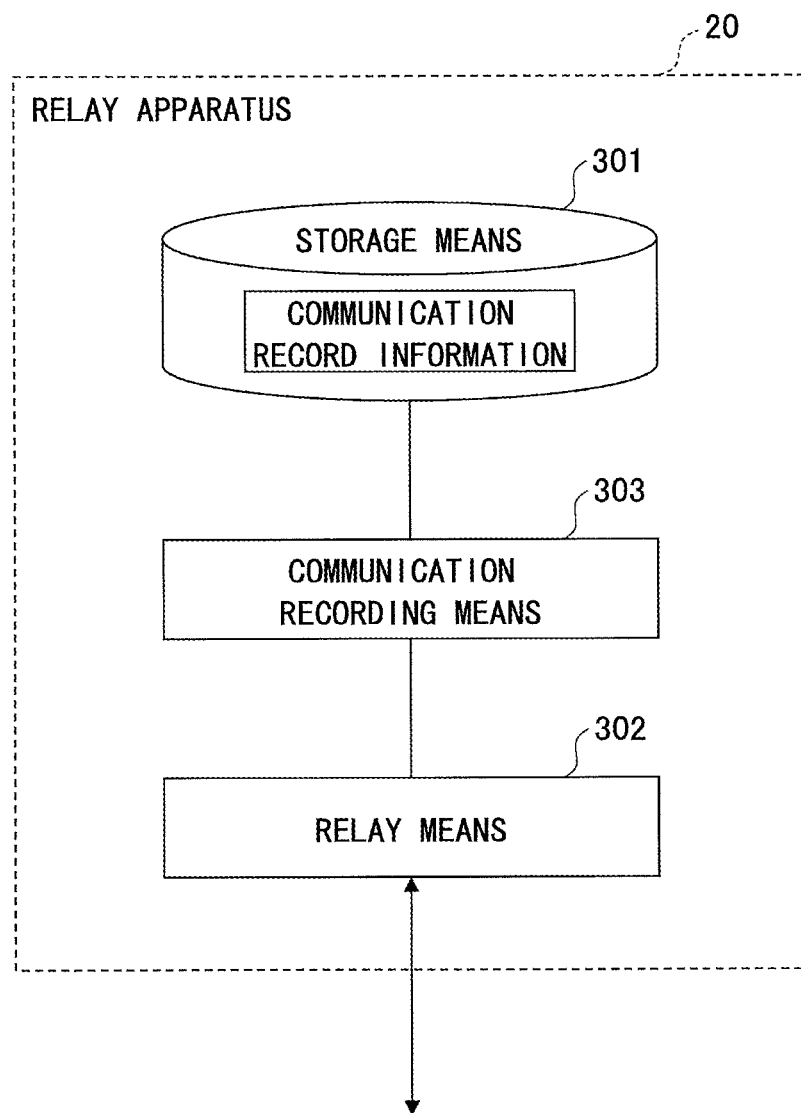
FIG. 5 is a diagram showing an example of a software configuration of a relay apparatus according to an embodiment.

FIG. 5 is a diagram showing an example of a software configuration of the relay apparatus in an embodiment. The relay apparatus 20 of the embodiment includes a storage means 301, a relay means 302, and a communication recording means 303. FIG. 5 shows an example of a software configuration of the relay apparatus in the embodiment, however, it is also possible to configure each function of the relay apparatus as hardware such an integrated circuits and the like, and the configuration shown in FIG. 5 can be taken as a hardware configuration. The storage means 301, the relay means 302, and the communication recording means 303 can be replaced with a storage unit 301, a relay unit 302, and a communication recording unit 303 respectively.

The storage means 301 can be realized by using the RAM 103, the HDD 104, or a storage device connected to the relay apparatus 20 via a network, or the like. The storage means 301 stores communication recording information that is captured data of P2P communication that the relay apparatus 20 relays.

The relay means 302 relays P2P communication performed between terminals 30.

By receiving an instruction from the communication control apparatus 10, the communication recording means 303 captures P2P communication performed between the terminals 30 and stores it in the storage means 301.

<Process Procedure>

(Flow of Processes of Communication Control Apparatus)

Figure 6:
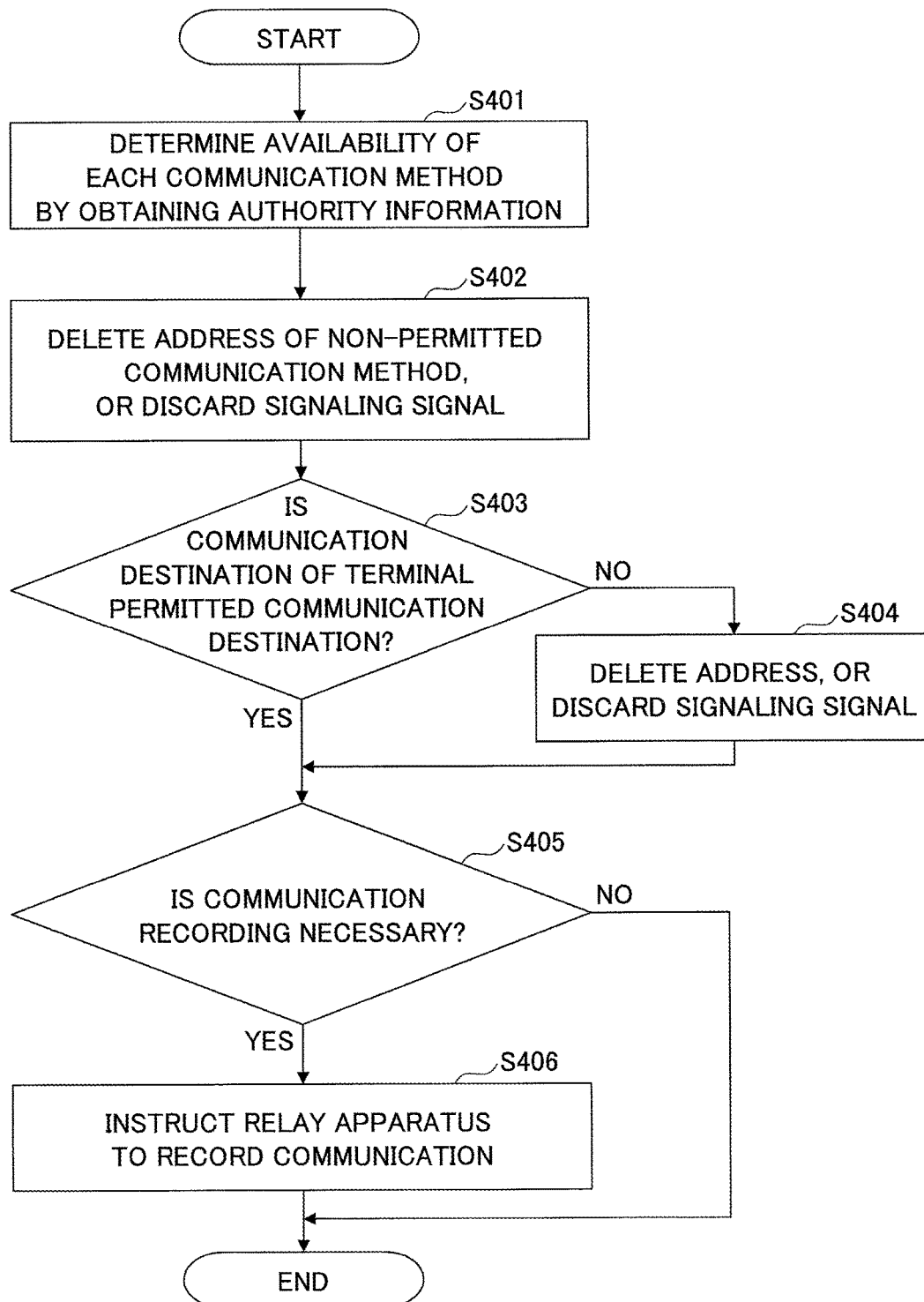
FIG. 6 is a flowchart showing an example of a process procedure of a communication control apparatus according to an embodiment.

FIG. 6 is a flowchart showing an example of a process procedure of the communication control apparatus. By the process procedure of FIG. 6, the communication control apparatus 10 controls the communication method of the P2P communication performed between the terminals 30 by rewriting or discarding a signaling signal that is transmitted and received between the terminals 30.

In step S401, when the communication method restriction means 203 receives a signaling signal from a terminal 30, the communication method restriction means 203 extracts a terminal identifier of a transmission source terminal of the signaling signal and a terminal identifier of a transmission destination terminal of the signaling signal that are included in the signaling signal, and obtains various flags (internal communication flag, external communication (without relay) flag, external communication (with relay) flag) included in records of the extracted terminal identifiers of records of the authority information table.

Next, the communication method restriction means 203 determines a communication method to permit for each of the terminals 30 that perform P2P communication based on each of the extracted various flags. The various flags corresponding to the terminal identifier of the transmission source terminal 30 of the signaling signal and the various flags corresponding to the terminal identifier of the transmission destination terminal 30 of the signaling signal are not necessarily the same. For example, there can be a case in which, all communication methods are permitted for the terminal 30a, on the other hand, only internal communication is permitted for the terminal 30b of the communication partner. In this case, the communication method restriction means 203 may permit all communication methods also for the terminal 30b like the terminal 30a, or conversely, the communication method restriction means 203 may only permit internal communication also for the terminal 30a like the terminal 30b.

In step S402, the communication method restriction means 203 deletes an IP address corresponding to a communication method that is not permitted from among IP addresses corresponding to each communication method included in the signaling signal received from the terminal 30, or discards the signaling signal that includes an IP address corresponding to a communication method that is not permitted without sending the signaling signal to the terminal 30.

In step S403, the communication destination determination means 204 determines whether an IP address of the terminal 30 used for "internal communication" and an IP address for relay of the relay apparatus 20 used for "external communication (with relay)", that are included in the signaling signal received in step S401, are included in records of the communication destination permission information. If at least an IP address from among these IP addresses is not included in records of the communication destination permission information, the communication destination determination means 204 determines that these IP addresses are not permitted communication destinations, and the process goes to a process procedure of step S404. When these IP addresses are included in records of the communication destination permission information, the communication destination determination means 204 determines that these IP addresses are permitted communication destinations, and the process goes to the process procedure of step S405.

In step S404, when the IP address of the terminal 30 used for "internal communication" is not a permitted communication destination, the communication destination determination means 204 deletes the IP address of the terminal 30 used for "internal communication", the IP address of the terminal 30 after NAT conversion used for external communication (without relay), and the IP address for relay of the relay apparatus 20 used for "external communication (with relay)" that are included in the signaling signal received in step S401, or discards all signaling signals including the IP address of the terminal 30 used for "internal communication", the IP address of the terminal 30 after NAT conversion used for external communication (without relay), and the IP address for relay of the relay apparatus 20 used for "external communication (with relay)" that are included in the signaling signal received in step S401 without transmitting the signaling signals to the terminal 30. The reason for deleting all of these IP addresses or discarding all signaling signals is to avoid that P2P communication is established using the communication method of external communication (without relay) or the communication method of external communication (with relay) even though only the IP address of the terminal 30 used for "internal communication" is deleted or only the signaling signal including the IP address of the terminal used for "internal communication" is discarded.

Also, when the IP address for relay of the relay apparatus 20 used for "external communication (with relay)" is not a permitted communication destination, the communication destination determination means 204 deletes the IP address for relay of the relay apparatus 20 used for "external communication (with relay)" or discards the signaling signal including the IP address for relay of the relay apparatus 20 used for "external communication (with relay)" without transmitting the signaling signal to the terminal 30.

In step S405, when the communication method of "external communication (with relay)" is permitted in step S401, the instruction means 205 determines that communication recording is necessary, and the process goes to the process procedure of step S406. When "external communication (with relay)" is not permitted in step S401, the process ends.

In step S406, the instruction means 205 instructs the relay apparatus 20 to record (capture) P2P communication performed between the terminals 30.

The communication control apparatus 10 may omit a part of the process procedures of S401-S406 as necessary as long as there is no contradiction in process procedures. For example, the communication control apparatus 10 may perform only process procedures of step S401 and step S402, or may perform only process procedures of step S401, step S402, step S405 and step S406. Also, the communication control apparatus 10 may perform only process procedures of step S403 and step S404, or may perform only process procedures of step S405 and step S406. Also, the communication control apparatus 10 may determine whether to omit a part of process procedures of S401~S406 by a terminal identifier of the terminal 30 that transmits and receives the signaling signal. By variously combining process procedures of FIG. 6, the communication control apparatus 10 of the present embodiment can control communication method performed between the terminals 30 in various methods.

(Whole Process Sequence of the Communication System)

Figure 7:
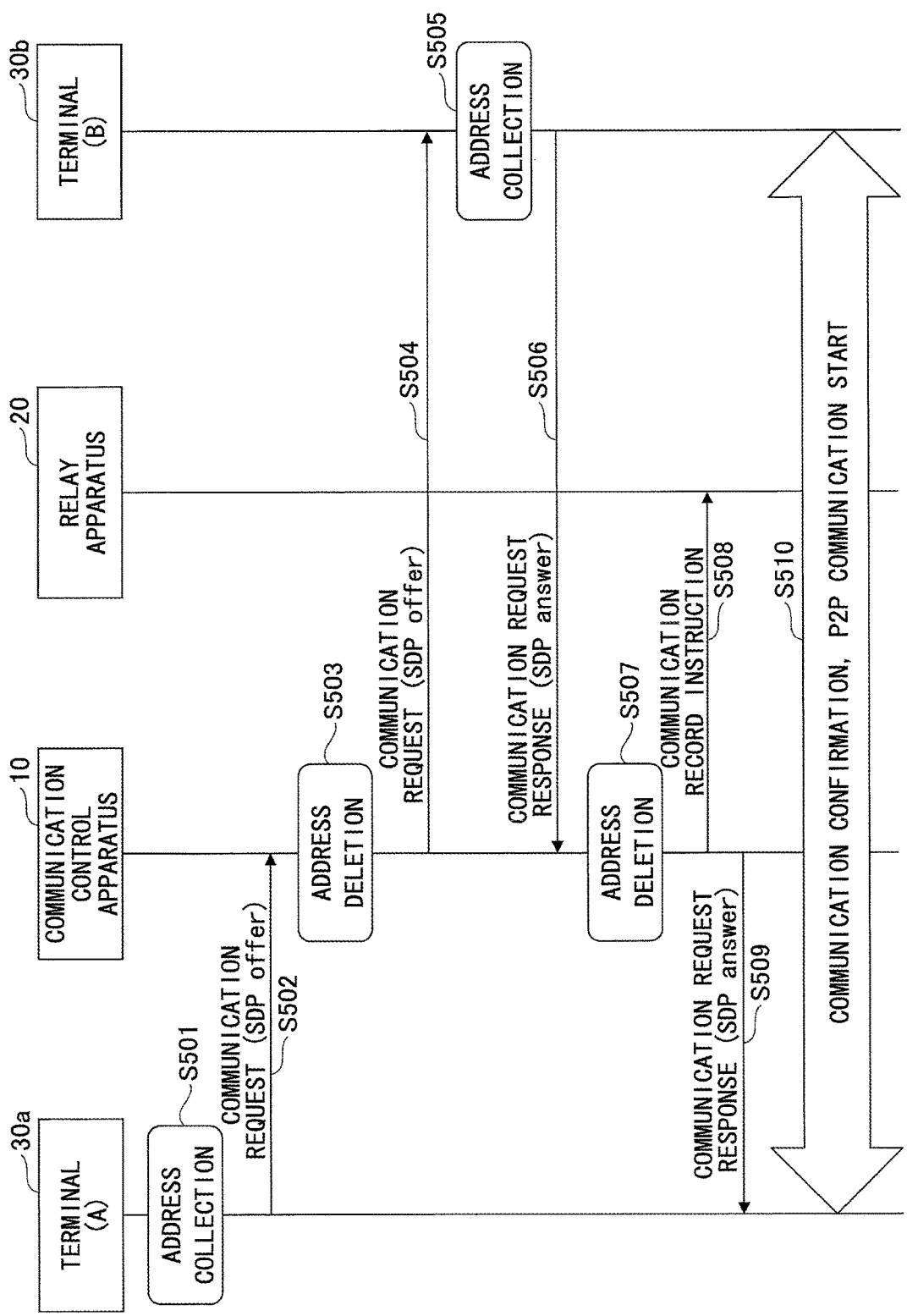
FIG. 7 is a sequence diagram showing an example of a process procedure of a communication system according to an embodiment.

FIG. 7 is a sequence diagram showing an example of a process procedure of the communication system according to an embodiment. FIG. 7 shows a process procedure in a case where the terminal 30a requests start of P2P communication to the terminal 30b.

In step S501, the terminal 30a collects address candidates according to the specification of ICE. The address candidates are an IP address and a port number of the terminal 30a itself used for internal communication, an IP address and a port number of the terminal 30a itself after NAT conversion used for external communication (without relay), and an IP address and a port number for relay of the relay apparatus 20 used for external communication (with relay). The terminal 30a collects the IP address and the port number of the terminal 30a itself after NAT conversion by inquiring a STUN server. Also, the terminal 30a collects the IP address and the port number for relay of the relay apparatus 20 used for external communication (with relay) by inquiring the relay apparatus 20. Note that the destinations of the STUN server and the relay apparatus 20 that the terminal 30a inquires are set beforehand in the client module operating on the Web browser.

In step S502, the terminal 30a transmits a communication request that is a signaling signal to the communication control apparatus 10.

FIGS. 8A and 8B are diagonals showing examples of the signaling signal. FIG. 8A is an example of a signaling signal transmitted from the terminal 30a to the terminal 30b in step S502. As shown in FIG. 8A, the communication request includes a terminal identifier (A) of the terminal 30a that is a transmission source of the signaling signal, a terminal identifier (B) of the terminal 30*b* that is a transmission destination of the signaling signal, and an SDP offer including the IP addresses and the port numbers collected in step S501.

In step S503, the communication method restriction means 203 of the communication control apparatus 10 performs processing according to process procedures of step S401~step S402 of FIG. 7, and deletes an IP address included in the SDP offer when there is a communication method that is not permitted. Also, when there is an IP address that is not included in the connection destination control information, the communication destination determination means 204 of the communication control apparatus 10 deletes an address included in the SDP offer according to process procedures of step S403~step S404 of FIG. 7.

In step S504, the communication means 202 of the communication control apparatus 10 transmits a communication request, to the terminal 30*b*, that includes the SDP offer from which an address is deleted.

In step S505, the terminal 30*b* collects address candidates according to the specification of ICE. The address candidates are an IP address and a port number of the terminal 30*b* itself used for internal communication, an IP address and a port number of the terminal 30*b* itself after NAT conversion used for external communication (without relay), and an IP address and a port number for relay of the relay apparatus 20 used for external communication (with relay). The terminal 30*b* collects the IP address and the port number of the terminal 30*b* itself after NAT conversion by inquiring a STUN server. Also, the terminal 30*b* collects the IP address and the port number for relay of the relay apparatus 20 used for external communication (with relay) by inquiring the relay apparatus 20. Note that the destinations of the STUN server and the relay apparatus 20 that the terminal 30*b* inquires are set beforehand in the client module operating on the Web browser.

In step S506, the terminal 30*b* transmits a signaling signal that is a communication request response to the communication control apparatus 10. FIG. 8B is an example of a signaling signal transmitted from the terminal 30*a* to the terminal 30*b*. As shown in FIG. 8B, the communication request includes a terminal identifier (B) of the terminal 30*b* that is a transmission source of the signaling signal, a terminal identifier (A) of the terminal 30*a* that is a transmission destination of the signaling signal, and an SDP answer including the IP addresses and the port numbers collected in step S505.

In step S507, the communication method restriction means 203 of the communication control apparatus 10 performs processing according to process procedures of step S401~step S402 of FIG. 7, and deletes an address included in the SDP answer when there is a communication method that is not permitted. Also, when there is an IP address that is not included in the connection destination control information, the communication destination determination means 204 of the communication control apparatus 10 deletes an address included in the SDP answer according to process procedures of step S403~step S404 of FIG. 7. The communication method restriction means 203 of the communication control apparatus 10 deletes an IP address corresponding to a communication method the same as the communication method that is not determined to permit in step S503.

When the communication method of external communication (with relay) is permitted in the process procedures of step S503 and step S507, the instruction means 205 of the communication control apparatus 10 transmits a communication recording instruction to the relay apparatus 20, in step S508, according to the process procedure of step S405 and step S406 of FIG. 6. The communication record instruction includes the IP address and the port number for relay of the relay apparatus 20 that is included in the SDP offer received in step S502 and that is included in the SDP answer received in step S506. This is because the instruction means 205 notifies the relay apparatus 20 which P2P communication performed between terminals 30 to record.

The instruction means 205 may perform the process procedure of step P508 when only the communication method of external communication (with relay) is permitted in the process procedure of step S503 and step S507. The reason is that, there is a possibility in that the communication record instruction becomes useless since it is determined between the terminal 30*a* and the terminal 30*b* whether P2P communication is established by the communication method of external communication (with relay) or P2P communication is established by other communication methods.

In step S509, the communication means 202 of the communication control apparatus 10 transmits, to the terminal 30*a*, a communication request response including the SDP answer from which an address is deleted.

In step S510, the terminal 30*a* and the terminal 30*b* perform negotiation by transmitting packets in a priority order with each other to an address corresponding to each communication method exchanged by the signaling signal so as to establish P2P communication. Since no packet is transmitted to the deleted address, negotiation fails between the terminal 30*a* and the terminal 30*b*. When a packet is transmitted to an address that is not deleted, the packet reaches the partner terminal 30 as long as the packet is discarded by NAT processing. Thus, negotiation succeeds between the terminal 30*a* and the terminal 30*b*. That is, the terminal 30*a* and the terminal 30*b* can establish P2P communication only by a communication method or only with a communication partner, from which an address is not deleted.

In the above, the whole process sequence of the communication system has been described. However, in the communication system of the embodiment, the terminal 30*a* and the terminal 30*b* may mutually exchange addresses corresponding to communication methods of internal communication, external communication (without relay) and external communication (with relay) by a communication method called Trickle ICE.

In the case where the communication method of Trickle ICE is used, first, the terminal 30*a* transmits an SDP offer that does not include an address to the terminal 30*b* via the communication control apparatus 10, and in parallel, collects addresses corresponding to communication methods of internal communication, external communication (without relay) and external communication (with relay). In the same way, the terminal 30*b* transmits an SDP answer that does not include an address to the terminal 30*a* via the communication control apparatus 10, and in parallel, collects addresses corresponding to communication methods of internal communication, external communication (without relay) and external communication (with relay).

Next, each time when the terminal 30*a* collects any address of the addresses corresponding to communication methods of internal communication, external communication (without relay) and external communication (with relay), the terminal 30*a* transmits a signaling signal including a collected address to the terminal 30*b* via the communication control apparatus 10. In the same way, each time when the terminal 30b collects any address of the addresses corresponding to communication methods of internal communication, external communication (without relay) and external communication (with relay), the terminal 30b transmits a signaling signal including a collected address to the terminal 30a via the communication control apparatus 10.

In the case where an address is exchanged in each time between the terminal 30a and the terminal 30b by the communication method of Trickle ICE, when the signaling signal that is transmitted and received between the terminal 30a and the terminal 30b includes a non-permitted communication method or an IP address that is not included in the connection destination restriction information, the communication method restriction means 203 or the communication destination determination means 204 of the communication control apparatus 10 discards the signaling signal.

Accordingly, the signaling signal that includes a non-permitted communication method or an IP address that is not included in the connection destination restriction information is discarded on the communication control apparatus 10. Thus, the terminal 30a and the terminal 30b can establish P2P communication only by a communication method or only with a communication partner for which a signaling signal can be received.

<Effect>

As described above, the communication control apparatus 10 of the embodiment controls communication methods of P2P communication performed between the terminals 30 by deleting an address included in the signaling signal that is transmitted and received between the terminals 30 or by discarding the signaling signal based on authority information associated with each terminal 30. Accordingly, it becomes possible that the communication control apparatus 10 of the embodiment flexibly controls P2P communication performed between the terminals 30.

Also, the communication control apparatus 10 of the embodiment stores authority information for each terminal identifier, so that the communication control apparatus 10 can control communication destinations for each terminal 30. Accordingly, it becomes possible to perform flexible operation in which, for example, a communication method to permit is changed based on a position of a user of the terminal.

Also, the communication control apparatus 10 of the embodiment can instruct the relay apparatus 20 to record P2P communication as necessary. Accordingly, for example, it becomes possible to perform operation in which all contents of P2P communication performed by terminals 30 in a company are recorded.

Also, the communication control apparatus 10 of the embodiment can restrict a communication partner that the terminal 30 intends to perform P2P communication with by deleting an address included in the signaling signal transmitted and received between the terminals 30 or by discarding the signaling signal, based on the communication destination permission information. Accordingly, it becomes possible to perform operation in which, for example, performing P2P communication with a terminal 30 outside of the company is prohibited, so that it becomes possible to strengthen security. Also, it becomes possible to perform operation in which, for example, only P2P communication via a trusted relay apparatus 20 is permitted, so that it becomes possible to decrease security risk such as interception of communication content by a malicious relay apparatus 20.

<Supplement of Embodiment>

In the present embodiment, the terminal identifier may be a user ID of a user who uses the terminal 30, for example.

In the present embodiment, the communication control apparatus may store communication destination permission information and a terminal identifier (or user ID) by associating them with each other. Also, the communication destination determination means 204 may delete an IP address included in a signaling signal or discard the signaling signal based on communication destination permission information corresponding to a terminal identifier of a signal transmission source and a terminal identifier of a signal transmission destination included in the signaling signal. Accordingly, it becomes possible to control a communication destination for each terminal 30, so that flexible operation can be performed in which, for example, a permitted communication method is changed based on a position of a user of a terminal.

In the present embodiment, the communication destination permission information stores an address permitted as a communication destination of the terminal 30 (white list scheme), however, the communication destination permission information may store an address that is not permitted as a communication destination of the terminal 30 (black list scheme). In the case of the black list scheme, in step S403 of FIG. 6, the communication destination determination means 204 operates such that it determines whether an IP address of the terminal 30 used for "internal communication" and an IP address for relay of the relay apparatus 20 used for "external communication (with relay)", included in the signaling signal received in step S401, are included in records of the communication destination permission information. Also, when at least an IP address of these IP addresses is included in records of the communication destination permission information, the communication destination determination means 204 operates such that it determines that these IP addresses are not permitted communication destinations to proceed to the process procedure of step S404. Also, when these IP addresses are not included in records of the communication destination permission information, the communication destination determination means 204 determines that these IP addresses are permitted communication destinations to proceed to the process procedure of step S405.

In the above, the present invention is not limited to the embodiment, and various modifications and improvements are available within a range of the present invention.

In the above, in sequences and flowcharts described in the embodiment, order of processes may be changed in so far as there is no inconsistency.

In the above, all or a part of the embodiment may be implemented by a program. The program can be stored in a storage medium.

The communication means 202 is an example of reception means. Also, the communication method restriction means 203 and the communication destination determination means 204 are an example of control means respectively. Also, the internal communication, the external communication (without relay) flag, and the external communication (with relay) are examples of communication methods of P2P communication. Also, an IP address and a port number are an example of address information. Also, the communication destination permission information is an example of communication destination information.

The present patent application claims priority based on Japanese patent application No. 2015-015899, filed in the JPO on Jan. 29, 2015, and Japanese patent application No. 2015-015904, filed in the JPO on Jan. 29, 2015, and the entire contents of the Japanese patent application No. 2015-015899 and the Japanese patent application No. 2015-015904 are incorporated herein by reference.

DESCRIPTION OF REFERENCE SIGNS 10 communication control apparatus
20 relay apparatus
30 terminal
201, 301 storage means
202 communication means
203 communication method restriction means
204 communication destination determination means
205 instruction means
302 relay means
303 communication recording means

The invention claimed is:

1. A communication control apparatus connected to two terminals and to a relay apparatus that relays P2P communication performed between the two terminals, comprising:
   a memory configured to store authority information including a communication method of the P2P communication permitted for each of the two terminals; and
   processing circuitry configured to
      receive a signaling signal mutually transmitted between the two terminals, and
      control the communication method of the P2P communication based on the authority information when receiving the signaling signal,
   wherein the communication method of the P2P communication is at least one of three communication methods corresponding to: local communication without passing through a NAT, communication that traverses a NAT but does not use a TURN server, and communication that uses a TURN server.

2. The communication control apparatus as claimed in claim 1, wherein the processing circuitry controls the communication method of the P2P communication by deleting address information included in the received signaling signal or discarding the signaling signal.

3. The communication control apparatus as claimed in claim 1, the processing circuitry being configured to instruct the relay apparatus to record the P2P communication based on the authority information when receiving the signaling signal.

4. The communication control apparatus as claimed in claim 1, wherein the signaling signal is a signal used for establishing P2P communication by communication means of WebRTC.

5. A communication system comprising two terminals, a relay apparatus that relays P2P communication performed between the two terminals, and a communication control apparatus that controls the P2P communication,
   the communication control apparatus comprising:
      a memory configured to store authority information including a communication method of the P2P communication permitted for each of the two terminals; and
      processing circuitry configured to
         receive a signaling signal mutually transmitted between the two terminals,
         control the communication method of the P2P communication based on the authority information when receiving the signaling signal, and
         instruct the relay apparatus to record the P2P communication based on the authority information when receiving the signaling signal,
   the relay apparatus comprising:
      processing circuitry configured to record the P2P communication when receiving the instruction,
   wherein the communication method of the P2P communication is at least one of three communication methods corresponding to: local communication without passing through a NAT, communication that traverses a NAT but does not use a TURN server, and communication that uses a TURN server.

6. A communication control method in a communication control apparatus connected to two terminals and to a relay apparatus that relays P2P communication performed between the two terminals, comprising:
   storing, in a memory, authority information including a communication method of the P2P communication permitted for each of the two terminals;
   receiving a signaling signal mutually transmitted between the two terminals; and
   controlling the communication method of the P2P communication when receiving the signaling signal,
   wherein the communication method of the P2P communication is at least one of three communication methods corresponding to: local communication without passing through a NAT, communication that traverses a NAT but does not use a TURN server, and communication that uses a TURN server.

7. A non-transitory storage medium storing a communication control program in a communication control apparatus connected to two terminals and to a relay apparatus that relays P2P communication performed between the two terminals, the communication control program causing the communication control apparatus to perform:
   storing, in a memory, authority information including a communication method of the P2P communication permitted for each of the two terminals;
   receiving a signaling signal mutually transmitted between the two terminals; and
   controlling the communication method of the P2P communication based on the authority information when receiving the signaling signal,
   wherein the communication method of the P2P communication is at least one of three communication methods corresponding to: local communication without passing through a NAT, communication that traverses a NAT but does not use a TURN server, and communication that uses a TURN server.

8. A communication control apparatus that is connected, via a network, to a terminal and to a relay apparatus relaying P2P communication performed by the terminal, and that controls communication performed by the terminal, comprising:
   a memory configured to store communication destination information including a communication destination permitted for the terminal; and
   processing circuitry configured to
      receive, from the terminal, a signaling signal that the terminal transmits when the terminal starts the P2P communication, and
      control whether to permit the P2P communication based on the communication destination information and the signaling signal,
   wherein the communication destination information includes address information of a communication destination permitted for the terminal or address information of the relay apparatus, and
   the processing circuitry controls whether to permit the P2P communication by comparing the address information of the communication destination included in the signaling signal with address information included in the communication destination information.

9. The communication control apparatus as claimed in claim 8, wherein, when the P2P communication is not permitted, the processing circuitry performs control not to permit the P2P communication by deleting the address information of the communication destination included in the signaling signal or by discarding the signaling signal.

10. The communication control apparatus as claimed in claim 8, wherein the signaling signal is a signal that is used for establishing P2P communication by communication means of WebRTC.

11. A communication control method in a communication control apparatus that is connected, via a network, to a terminal and to a relay apparatus relaying P2P communication performed by the terminal, and that controls communication performed by the terminal, comprising:
   storing, in a memory, communication destination information including a communication destination permitted for the terminal;
   receiving, from the terminal, a signaling signal that the terminal transmits when the terminal starts the P2P communication; and
   controlling, by processing circuitry, whether to permit the P2P communication based on the communication destination information and the signaling signal,
   wherein the communication destination information includes address information of a communication destination permitted for the terminal or address information of the relay apparatus, and
   the processing circuitry controls whether to permit the P2P communication by comparing the address information of the communication destination included in the signaling signal with address information included in the communication destination information.

12. A non-transitory storage medium storing a communication control program in a communication control apparatus that is connected, via a network, to a terminal and to a relay apparatus relaying P2P communication performed by the terminal, and that controls communication performed by the terminal, the communication control program causing the communication control apparatus to perform:
   storing, in a memory, communication destination information including a communication destination permitted for the terminal;
   receiving, from the terminal, a signaling signal that the terminal transmits when the terminal starts the P2P communication; and
   controlling, by processing circuitry, whether to permit the P2P communication based on the communication destination information and the signaling signal,
   wherein the communication destination information includes address information of a communication destination permitted for the terminal or address information of the relay apparatus, and
   the processing circuitry controls whether to permit the P2P communication by comparing the address information of the communication destination included in the signaling signal with address information included in the communication destination information.

\* \* \* \* \*